United States Patent [19]

McLean

[11] 4,335,697
[45] Jun. 22, 1982

[54] INTERNAL COMBUSTION ENGINE DUAL FUEL SYSTEM

[76] Inventor: Kerry L. McLean, 20540 Westhampton, Southfield, Mich. 48075

[21] Appl. No.: 138,434

[22] Filed: Apr. 8, 1980

[51] Int. Cl.³ ............................................. F02M 13/06
[52] U.S. Cl. .................................... 123/527; 123/525
[58] Field of Search ................................ 123/525, 527

[56] References Cited

U.S. PATENT DOCUMENTS

| 1,973,142 | 9/1934 | Day et al. | 123/527 |
| 2,315,882 | 4/1943 | Trimble | 123/525 |
| 2,357,947 | 9/1944 | Gerson | 123/527 |
| 2,381,304 | 8/1945 | Merrill | 123/527 |
| 2,939,775 | 6/1960 | Middleton | 123/527 |
| 4,068,639 | 1/1978 | Cook | 123/525 |

Primary Examiner—Ronald B. Cox
Attorney, Agent, or Firm—Hauke and Pataladis

[57] ABSTRACT

An internal combustion engine dual fuel system for controllably running the internal combustion engine on a liquid fuel, such as gasoline, in the usual manner or, at will, on liquified petroleum (LP) gaseous fuel. The conventional liquid fuel system of the internal combustion engine is unmodified except for the addition of a remotely controlled shut-off valve in the fuel line at the carburetor fuel inlet. An LP gas suction venturi is disposed in the air induction flow to the carburetor inlet, for example by being mounted in the air filter above the carburetor inlet, and is supplied in fuel from the vapor phase of an LP gas, such as butane or propane, above the level of the liquified gas in an appropriate tank. The LP gas tank and the line supplying the gas to the carburetor air inlet are maintained at a substantially constant temperature via a by-pass of the engine coolant circuit, the flow of coolant through the by-pass being automatically controlled by a thermostat. A manual control, in the form of an electrical switch, is provided for shutting off the flow of LP gas while running the engine on conventional liquid fuel, and shutting off the flow of liquid fuel to the carburetor while running the engine on LP gas.

40 Claims, 5 Drawing Figures

INTERNAL COMBUSTION ENGINE DUAL FUEL SYSTEM

BACKGROUND OF THE INVENTION

The present invention relates to liquified petroleum (LP) gas fuel system for internal combustion engines, and more particularly to a dual fuel system permitting to run an internal combustion engine at will on LP gas or on conventional liquid fuel, such as gasoline.

The air pollution problems inherent in the operation of gasoline fueled and diesel-oil fueled internal combustion engines are well known. Although various emission control devices have been used in the past and are presently in use, and although emission control devices are required by federal legislation and regulations to reduce the amount of pollutants discharged in the atmosphere by internal combustion engines, emission control devices are not entirely satisfactory, they are subject to deterioration with the passage of time, and they are often a hindrance preventing the internal combustion engine from operating at best efficiency and at an economical fuel consumption rate.

Liquid fuels, other than gasoline and diesel fuel, have been proposed for the purpose of reducing consumption of fossil fuels and of decreasing the quantity and the toxicity of the pollutants discharged in the atmosphere. Natural gas and LP gases, such as porpane and butane, have also been proposed as a replacement for conventional liquid fuels such as gasoline, for the purpose of reducing atmospheric pollution, decreasing the operating costs of internal combustion engines, as compared to the costs of operating on gasoline, and the volume of contaminant emission, as compared to gasoline, without complex emission control devices, or for the purpose of entirely eliminating emission control devices. The use of natural gas as a fuel for internal combustion engines is convenient for stationary engines, such as pipeline compressor engines, engines used in oil field operations, water pumping, or production of electricity, for example. However, the use of natural gas as a fuel for internal combustion engine mobile installations, such as in motor vehicles and the like, presents many inconveniences as natural gas must be compressed in thick-walled tanks at a very high pressure, and a battery of a plurality of relatively small high pressure tanks is required for providing a motor vehicle with a reasonable range between refueling stops. Furthermore, natural gas compressor stations are not readily available to the average motorist.

The use of LP gases, such as butane and preferably propane, presents many advantages over the use of natural gas for fueling internal combustion engines. For example, propane is in a liquid phase under a relatively low pressure at room temperature and requires only thin-walled tanks for safe containment. Many systems using LP gases for fueling internal combustion engines have been proposed and some are presently in use in particular applications such as for service trucks, small tractors, lift trucks and the like, in manufacturing plants and in mines, and for fueling motor vehicles operated by LP gas producers, distributors and dealers.

An example of LP gas fuel systems for motor vehicles is disclosed in U.S. Pat. No. 2,855,759, and diverse dual fuel systems have been proposed to permit conventional internal combustion engines to run on a gaseous fuel, or to run at will on a gaseous fuel or on a liquid fuel such as gasoline, as desired, as disclosed for example in U.S. Pat. Nos. 4,056,087 and 4,063,905 and in Popular Mechanics of September, 1979 (page 48) and April, 1980 (pages 108-109, 201). In heretofore known LP gas fueling systems or dual fuel LP gas and gasoline systems, whether the LP gas is supplied from the LP gas tank in a liquid or in a gaseous phase, complete dual fuel mixing systems are required, thus necessitating the replacement of the conventional gasoline carburetor by an LP gas mixer, or by LP gas mixer and gasoline carburetor combined in a single unit or, in the alternative, by mounting a complex gas mixer at the inlet of the carburetor or in the form of a flange adapter between the carburetor and the engine inlet manifold.

SUMMARY OF THE INVENTION

The principal object of the invention is to provide a relatively simple but efficient dual fuel system for an internal combustion engine allowing the internal combustion engine to run on conventional gasoline fuel or on LP gas fuel, such as propane for example, without any modification to the internal combustion engine or to the gasoline fuel system. The present invention also provides an LP gas fuel system for a conventional internal combustion engine which may be substituted for the gasoline fuel system if so desired, although when used in a dual fuel system is permits to run an internal combustion engine on gasoline fuel or on LP gas fuel, at will, and to switch from one type of fuel to the other without requiring special adjustment or set-up of the carburetor system or of the ignition system.

This, and other objects of the present invention, will become apparent to those skilled in the art, when the following description of an example of the best modes contemplated for practicing the invention is read in conjunction with the accompanying drawing wherein:

DETAILED DESCRIPTION OF THE PREFERRED EMBODIMENTS

Figure 1:
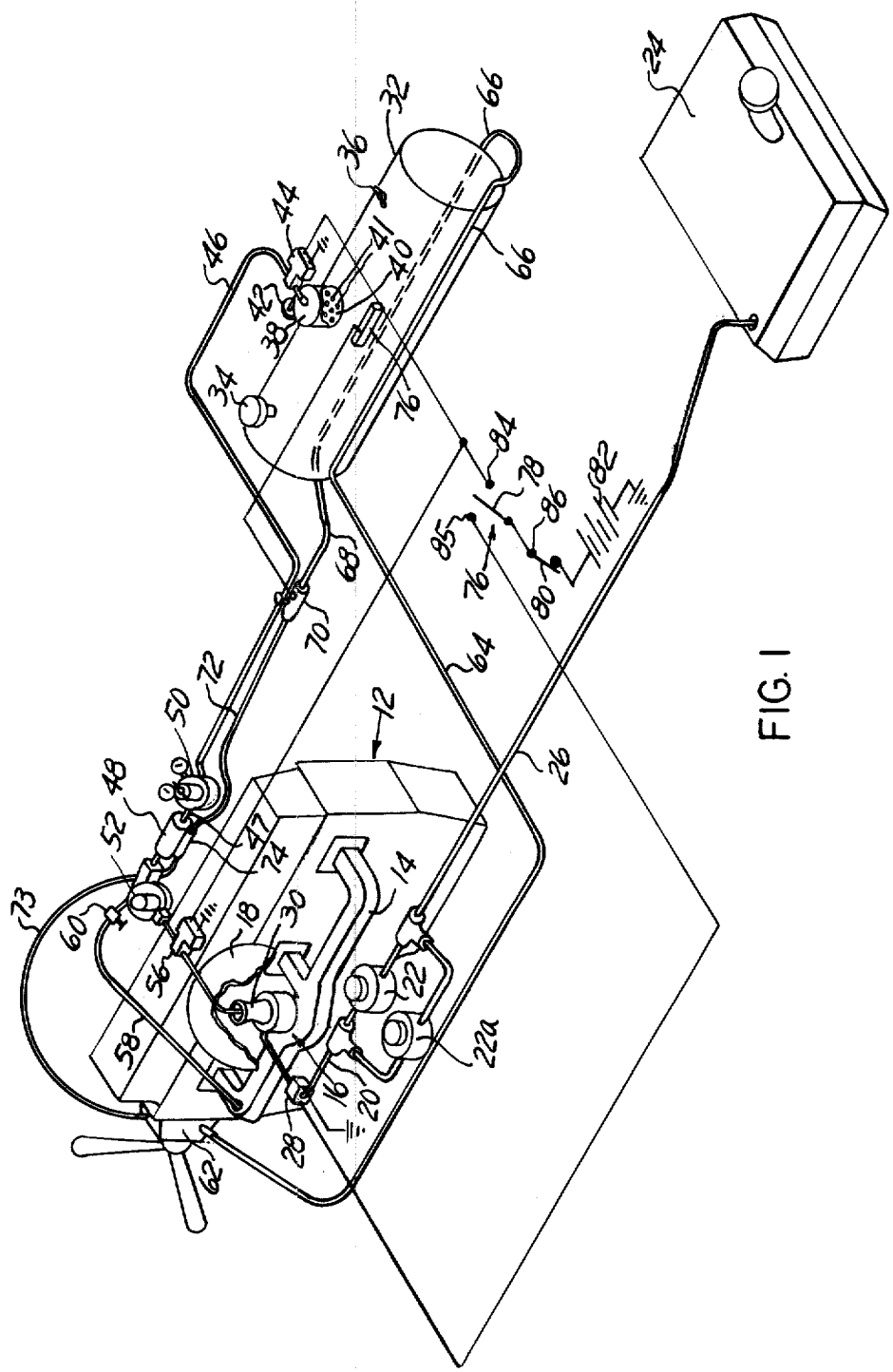
FIG. 1 is a schematic of an example of dual fuel system for internal combustion engines according to the present invention.

Referring now to FIG. 1, there is illustrated in a schematic manner an internal combustion engine 12 provided with an inlet manifold 14 having appropriate tubular branches leading to the valved intake ports of the engine cylinders. The inlet manifold 14 is provided with an appropriate intake opening over which is mounted a conventional carburetor 16 provided with a conventional air filter 18. The carburetor 16 is supplied in gasoline through a line 20 from the pressure side of a fuel pump 22 whose suction side is connected to the outlet of a gasoline fuel tank 24 via a line 26. The fuel pump 22 may be a conventional mechanically driven pump or, preferably, it may be an electric pump. A solenoid actuated valve 28 is placed in the fuel line 20 between the outlet of the pump 22 and the inlet of the carburetor 16. The exhaust manifold of the engine 12 is not represented. The engine 12 is an engine having its cylinders in line, such as a six-cylinder in line, for example, although it is evident that the invention is adaptable to any type of internal combustion engines, preferably of the spark-ignition type.

In a dual fuel system, according to the invention, LP gas, such as propane for example, is fed to the air intake of the carburetor 16 by means of a double venturi proportional mixer 30 installed within the air cleaner 18, as described in further detail hereinafter. The propane gas or vapor is supplied from a tank 32 provided with an appropriate filler valve 34 for filling to not more than about 95% of its liquid volume capacity with liquid propane such as to leave above the level of the liquified gas a space or head filled with propane vapor. As commercial quality propane boils at atmospheric pressure around −44° F. (−42° C.), and its vapor pressure at −40° F. (−40° C.) is 3.6 PSIG which progressively increases to 128 PSIG at 70° F. (21° C.), a head of gaseous propane is always present above the level of liquid propane in the tank 32, within an extended range of ambient temperatures. The tank 32 is provided at its top with an over-pressure relief valve 36, for safety purpose, which may be vented by an appropriate line, not shown, to the exterior of a motor vehicle body, and with a vapor collecting dome 38 mounted, such as by welding, over an aperture in the tank wall provided with a vapor trap consisting of a partition 40 provided with a plurality of small apertures 41. The vapor collecting dome 38, with its vapor trap partition 40, ensures that only propane vapor fills the dome 38, any liquid propane due to condensation, or to sloshing or overflowing of the tank being returned to the main portion of the tank 32 through the apertures 41 in the vapor trap partition 40.

Propane vapor under pressure flows from the dome 38 through a manually controllable shut-off valve 42 and an electrically actuated solenoid shut-off valve 44 into a line 46 supplying propane gas to an expansion chamber 48 through a high pressure regulator 50 and a line 47. Gaseous propane flows, via a line 49 from the expansion chamber 48 through a vacuum operated control valve 52 to a low pressure propane vapor line 54 connected to the propane gas venturi inlet 30 mounted above the carburetor 16. An electrically actuated shut-off valve 56 is disposed in the low pressure line 54, and the suction side of the vacuum control valve 52 is connected via an appropriate line 58 to the interior of the inlet manifold 14. Between the inlet manifold 14 and the suction side of the vacuum control valve 52, a suitable adjustable regulator needle valve 60 is disposed to manually preset the amount of suction from the inlet manifold required to operate the vacuum control valve 52 to vary the flow of propane gas through the control valve 52 as a function of the load on the engine 12, as represented by the variations in suction in the inlet manifold 14, for best overall operation efficiency and fuel economy.

A hot coolant by-pass system is tapped at the engine water pump 62 and comprises a hose 64 supplying hot coolant to a tank heater pipe 66, or to a pair of tank heater pipes 66, as illustrated, which are mounted in contact with the exterior wall of the propane tank 32, preferably at the bottom thereof. The outlet of the pipe or pipes 66 is connected to a return hose 68 which, through a manually and solenoid operated valve 70, returns the hot coolant to the engine coolant circulation system through an intermediate return line 72 and a heating pipe 74 defining a heat exchanger for the expansion chamber 48. Preferably, the propane gas feed line 46 from the tank 32 to the high pressure regulator 50 is in physical engagement with the hot coolant return hose 68 and the return intermediate line 72, such as to ensure that, during normal operation, condensation or extreme cooling of the gas passing through the propane gas feed line is avoided through heat convected from the hot coolant return hose and line 68 and 72 to the propane gas feed line 46. The intermediate coolant return line 72, for the same reason, is laid in proximity and actually engaged with the high pressure regulator 50, and the heating pipe 74 of the expansion chamber 48 supplies heat to the expansion chamber to prevent condensation and to heat the propane gas flowing therethrough.

The hot coolant flow valve 70 is automatically operated from a temperature-sensing bulb or thermostat 76 such that the flow of coolant through the tank heating pipe or pipes 66 is turned on or shut off in such manner as to maintain the temperature of the propane tank 32, and of the propane contained therein, at a predetermined temperature preferably in the vicinity of 80° F. (26.5° C.), thus providing a substantially constant vapor pressure in the high pressure gas feed line 46, substantially 140 PSIG for such a temperature, resulting in a highly regulated flow of propane gas through the high pressure system without any large fluctuation of pressure. The flow of hot coolant through the system may be reverse of that described without influencing in any way the overall performance of the dual fuel system of the invention.

The high pressure propane gas shut-off valve 44 and the low pressure propane gas shut-off valve 56 are operated simultaneously from a three-position control switch 77 whose movable contact 78 is connected through, for example, the motor vehicle ignition switch 80 to the motor vehicle electrical battery 82, when the movable contact 78 of the switch 77 is in engagement with its fixed contact 84. By placing the movable contact 78 of the switch 77 in such position, the engine 12 is operated on propane gas, and in such a position of the switch movable contact the gasoline shut-off valve 28 shuts off the supply of gasoline to the carburetor 16. When the movable contact 78 of the switch 77 is engaged with its other fixed contact 85, the propane gas supply valves 44 and 36 are automatically shut off and the gasoline supply shut-off vavle 28 is turned on. In such a position of the switch movable contact, the engine 12 is operating on gasoline fuel.

If it is desired to operate the engine 12 on LP gas alone, there is no need, obviously, for the gasoline fuel tank 24, the gasoline feed line 26 and the gasoline fuel pump 22 and they may be removed or disconnected and the gasoline feed line inlet fitting to the carburetor 16 is plugged. In dual fuel installations, when it is desired to run the engine 12 on gasoline only, the switch 77 is operated from its neutral position to the position engaging the movable contact 78 with the fixed contact 85 to open the gasoline shut-off valve 28. As, during normal operation with the propane fuel system of the invention, the float chamber, not shown, of the carburetor 16 has been emptied, if the engine has been shut off while running on propane fuel, unless there is no objection against cranking the engine for a sufficiently long period of time that permits the pump 22 to replenish the float chamber of the carburetor with gasoline, it is best to use as a fuel pump 22 an electric pump rather than a mechanically actuated pump or, in the alternative, to install an electric fuel pump, as shown at 22a shunting the mechanical pump or, alternately, mounted in series in the fuel line 26, such that by activating the electrical fuel pump 22a for a few seconds prior to starting the engine, the carburetor float bowl is replenished with gasoline.

In dual fuel systems, the engine 12 may thus be started and run on gasoline, in the usual manner, or it may be started and run on propane gas. In addition, as will be explained hereinafter in further detail, while operating on one fuel, the operation of the engine may be shifted to the other fuel, at will.

When it is desired to start the engine 12 on propane gas, the switch 77 is operated from its neutral position to the position engaging the movable contact 78 with the fixed contact 84. The propane gas high pressure shut-off valve 44 and the low pressure shut-off valve 56 are simultaneously activated such as to allow flow of propane gas therethrough. Due to the low temperature of vaporization propane, and as long as the ambient temperature is above about −40° F. (−40° C.), there is enough propane vapor pressure and flow through the system to provide sufficient flow through the line 54 into the double venturi 30 to enable starting the engine and starting driving the motor vehicle, in motor vehicle installations. As the engine warms up to normal operation temperatures, hot coolant circulates through the hose 64, the pipe or pipes 66, the return lines 68 and 72 and the heat transfer pipe 74 of the expansion chamber 48, to maintain the propane fuel tank 32 and its contents, the propane gas feed lines and the expansion chamber to a fairly constant temperature as regulated by the thermostat 76. The regulator 50 is preset to reduce the pressure of the propane gas downstream of the regulator anywhere between 2 and 15 psi, depending on the calibration of the system, the size of the lines and fittings, and the predetermined fuel requirement of the engine 12. The expansion chamber 48, which is normally maintained at engine temperature, acts as a trap for oil, water, or foreign materials which may be entrained in the propane gas flow and, more importantly yet, the expansion chamber acts as a storage for excess propane gas that may be called upon during sudden acceleration as a result of suddenly opening the throttle valve of the carburetor 16. The vacuum valve 52 regulates the flow of propane gas to the double venturi inlet 30 to the carburetor 16, as previously mentioned, as a function of the load demand on the engine, resulting in a self-regulating fuel and air mixture ratio remaining substantially constant.

While running the engine 12 on propane gas, if it is desred to switch over to gasoline fuel, the switch 77 is operated such that the movable contact 78 is displaced from engagement with the stationary contact 84 to engagement with the stationary contact 85. The propane gas shut-off valves 44 and 56 are automatically returned to their shut-off position, thus cutting off the supply of propane gas to the double venturi inlet 30 to the carburetor 16 and opening the gasoline supply shut-off valve 28. Gasoline fuel is supplied to the carburetor float bowl through the line 20 from the fuel pump 22, and the engine 12, after a predetermined delay during which the float bowl of the carburetor fills up with gasoline, is ready to operate exclusively on gasoline. The delay may be shortened by means of an electric pump being substituted for the mechanical fuel pump or by using an auxiliary electric pump 22a started prior to effecting the switch-over. The auxiliary electric pump 22a may be mounted, as shown, such as to shunt the mechanical pump 22, or it may be disposed in series with the mechanical pump 22 in the fuel line 26 or 20. When it is desired to switch back running the engine on propane gas, the switch 76 is actuated to its neutral position, which operates the shut-off valve 28 to cut off supply of gasoline to the carburetor. It is best to wait until the engine loses power, thus indicating that the supply of gasoline stored in the carburetor float bowl has been exhausted, before displacing the switch 77 to the position engaging its movable contact 78 with the stationary contact 84 re-establishing the propane gas fuel system into normal operation.

It will be readily appreciated that appropriate delays may be built in the control system to ensure proper switch-over from operating on one fuel to operating on the other, such that the supply of gasoline in the carburetor bowl is exhausted prior to the propane gas geing turned on and that, during switch-over from propane gas to gasoline fuel, the supply of gasoline in the carburetor float bowl is automatically re-established before switch-over is accomplished.

Figure 2:
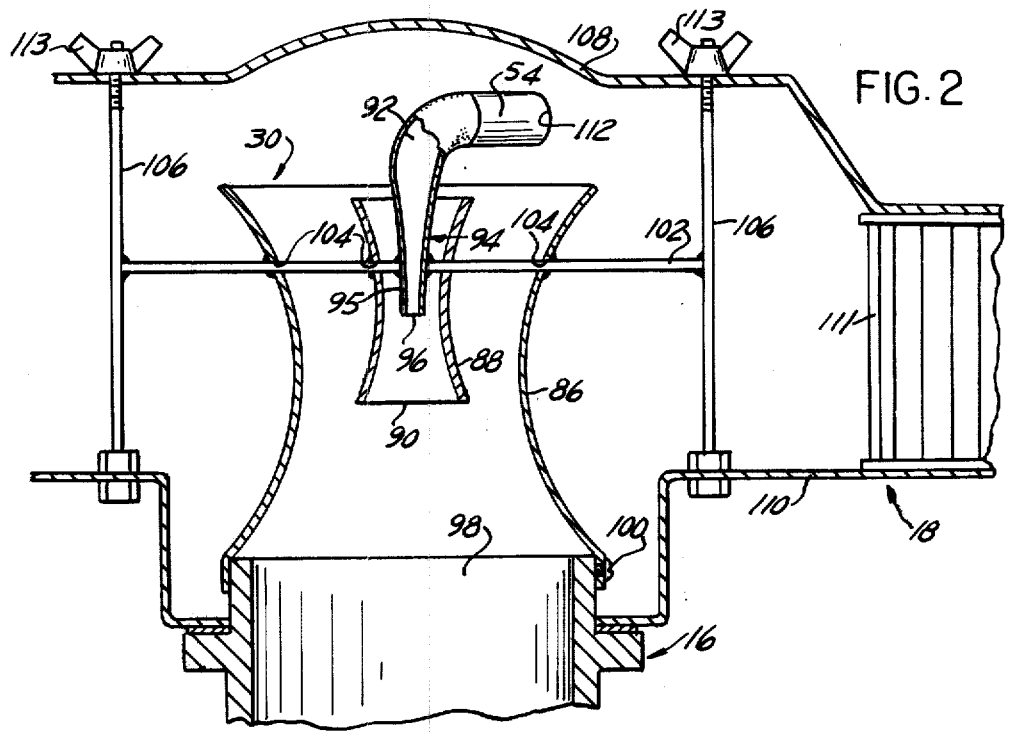
FIGS. 2 and 3 are schematic representations of examples of LP gas double venturi mixer adapter disposed at the inlet of a conventional gasoline carburetor, according to the present invention.

As illustrated at FIG. 2, the double venturi 30 comprises an outer venturi member 86 having an inner smaller diameter venturi member 88 disposed concentrically therein. The inner venturi member 88 has a total length which is approximately one-half that of the larger outer venturi member 86 such that the outlet 90 of the inner venturi member is disposed substantially in the plane of the smallest inner diameter of the outer venturi member 86. The propane gas low pressure line 54 is connected to an elbow fitting 92 ending in a nozzle 94 disposed concentrically within the inner venturi member and being in the form of a tapered tubular body member 95 defining a nozzle outlet 96 disposed substantially in a plane corresponding to the plane of smallest diameter of the interior of the inner venturi 88. In such manner, the air flowing into the outer venturi 86 on its way to the intake throat 98 of the carburetor 16 creates a maximum drop of pressure at the outlet 90 of the inner venturi member 88, thus causing a high velocity flow through the inner venturi 88. The outlet 96 of the propane gas supply nozzle 94 being placed on the plane of maximum velocity of the air flow through the inner venturi 88 creates maximum suction of the supplied propane gas providing thorough mixing of the propane gas with the entrained air, maximum flow of gas with full throttle opening, minimum flow of gas with fully closed throttle, except for idling adjustment, and no flow of gas upon shutting off the engine, as the pressure of the propane gas flowing through the low pressure line 54 and the nozzle 94 is lower than atmospheric pressure.

FIG. 2 represents a typical installation for single barrel carburetor or, in the alternative, a typical installation for a single double venturi unit 30 mounted over the intake of a multiple-barrel carburetor. In the example of structure of FIG. 2, the outer venturi member 86 is mounted directly on the inlet of the carburetor 16 by means of, for example, set screws 100, and concentrically supports by way of at least a pair of diametrally disposed rods 102 the inner venturi member 88 and the gas supply nozzle 94, the rods 102 passing through appropriately aligned apertures 104 through the walls of the venturi members 86 and 88 and being soldered or brazed thereto at the edge surface of the apertures 104. One end of the rods 102 is soldered, brazed or welded to the peripheral surface of the tapered body portion 95 of the nozzle 94. The other end of the rods 102 is soldered, brazed or welded to vertically disposed studs 106 which interconnect the cover 108 and the housing 110 of the air filter 10 provided with a conventional air filter element 111, the low pressure gas line 54 being passed through an appropriate aperture 112 in the air filter cover 108. The air filter cover 108 is provided with apertures through which are passed the threaded end of the studs 106, wing nuts 113 being used for holding the cover 108 in position.

It is readily apparent that other means are available for installing the propane gas nozzle and double venturi assembly within the air filter. For example, the gas nozzle-venturi assembly 30 may be mounted in any convenient position in the air filter 18 such as being, for example attached to the rod holding the air filter cover 108 in position, such an arrangement being shown schematically at FIG. 3 for supplying propane gas at the intake of a multiple-barrel carburetor, such as a double-barrel carburetor 16.

Figure 3:
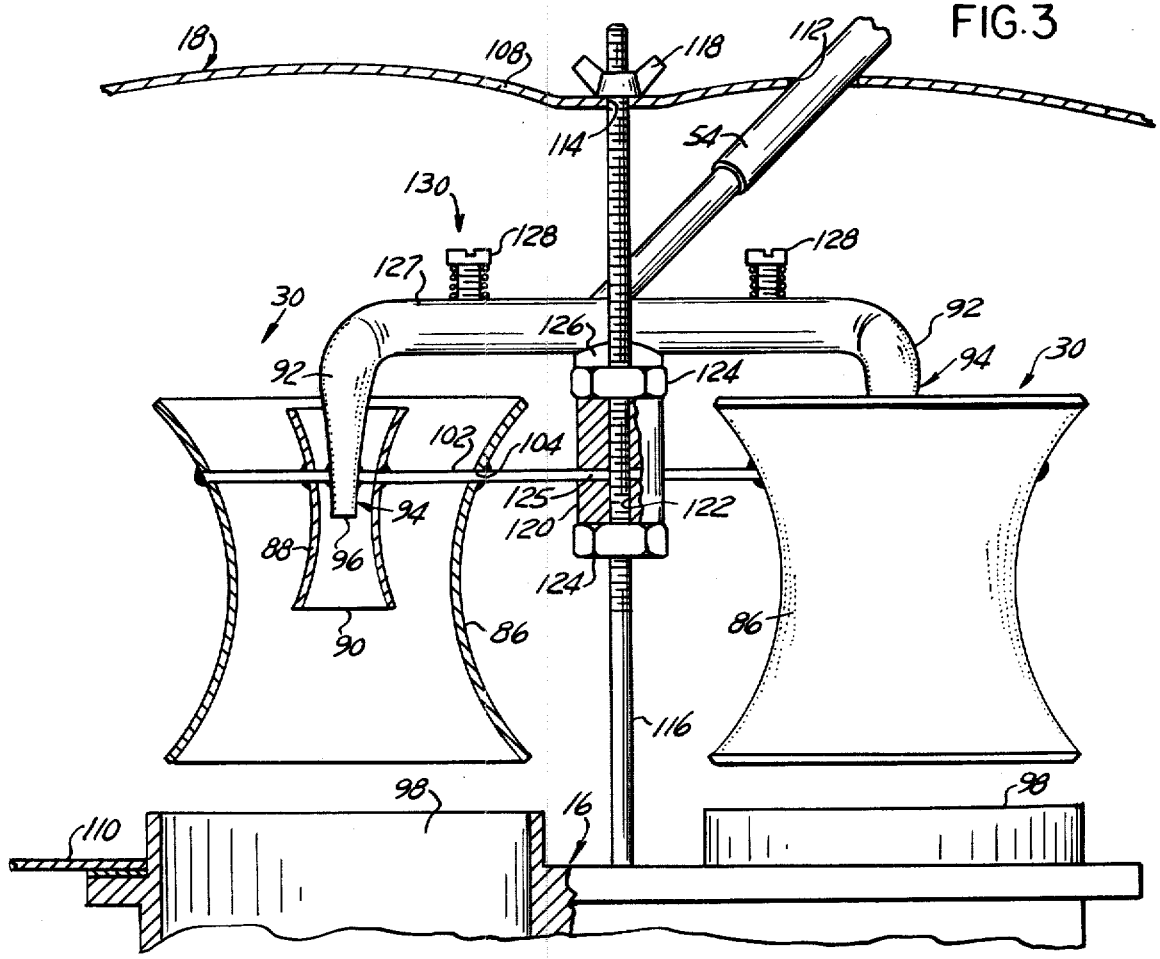

In the structure of FIG. 3, the cover 108 of the air filter 18 is held in position in a conventional manner as being provided with a central aperture 114 through which passes the threaded end of a rod 116 attached at its other end to the housing of the carburetor 16, a wing nut 118 being used for holding the air filter cover 108 in position. Although a single gas nozzle-venturi unit 30 could be used, having an over-all diameter large enough to cover the inlet throats 98 of all the carburetor barrels, a two-barrel twin venturi assembly 130 is illustrated, formed of a pair of nozzle-venturi assemblies 30, each disposed over, and a slight distance away from, the inlet throat 98 of each carburetor barrel. The twin venturi assembly 130 is supported by a bracket 120 having a central aperture 122 through which passed a portion of the rod 116, a pair of nuts 124 being used for clamping the support bracket 120 in position over the rod 116. The ends of the support rods 102 for the nozzle-venturi assemblies 30 are fastened through, for example, radial bores 125, disposed in the support bracket 120 and are soldered, brazed or welded therein. The support bracket 120 has an arm 126 at the end of which is soldered, brazed or welded a bifurcated gas header 127 provided at each end with a gas nozzle 94. The gas header 127 is connected to the low pressure propane gas line 54, and each branch of the gas header 127 may be provided with a flow rate adjusting screw 128, such as to balance and equalize the gas flow rate through each nozzle 94 in synchronized action multi-barrel carburetor installations, and as to pre-set the gas flow rate proportions between nozzles in progressive action multi-barrel carburetor installations.

Figure 4:
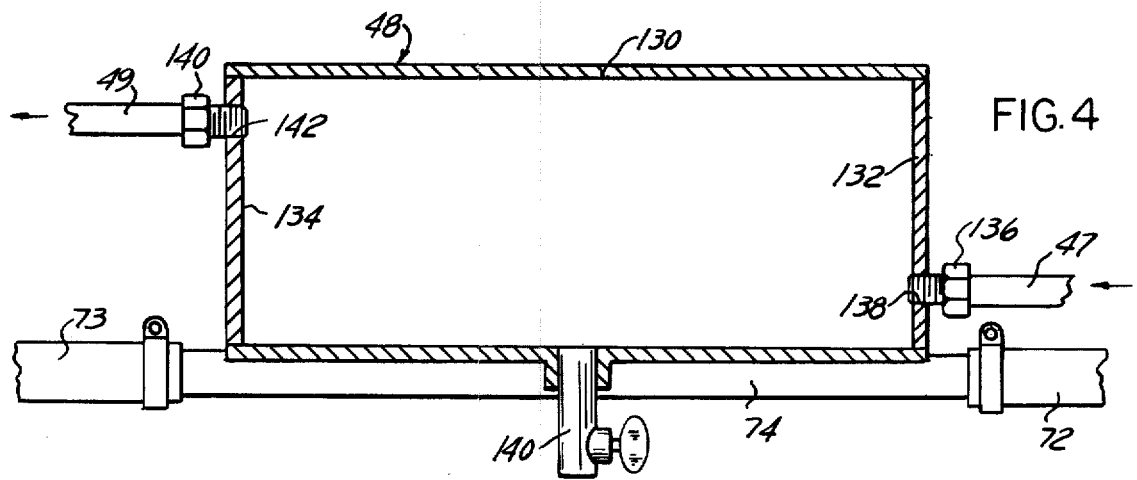
FIG. 4 is a schematic partial section through a portion of the fuel system of FIG. 1.

Referring to FIG. 4, there is illustrated in section the propane gas expansion chamber 48 formed of a tubular member 130 provided with end closure plates 132 and 134 brazed or welded in position. Propane gas is introduced into the space within the tubular member 130 and the end plates 132 and 134 from the pressure regulator 50, FIG. 1, by way of the connection inlet line 47 and an appropriate threaded fitting 136 threading through an appropriate threaded aperture 138 disposed at a relatively low level in the end closure plate 132. The propane gas stored within the expansion chamber 48 is supplied on demand to the proportioning and modulating valve 52, FIG. 1, through the connection line 49 provided on its end with an appropriate fitting 140 threaded into a threaded aperture 142 disposed at a relatively higher level through the end closure plate 134. Heat is supplied from the intermediate hot coolant line 72 to the heat exchanger pipe 74, and from the heat exchanger pipe 74 is returned to the engine coolant system via the return line or hose 73. The heat exchanger pipe 74 is welded or brazed to a portion of the peripheral surface of the tubular member 130. A drain pipe and petcock 140 is disposed at a low point of the tubular member 130 for occasionally draining the interior of the expansion chamber 48 from any accumulation of oil, water, or any other materials which may condense or be trapped within the expansion chamber, and which are generally present in commercial grade propane.

Figure 5:
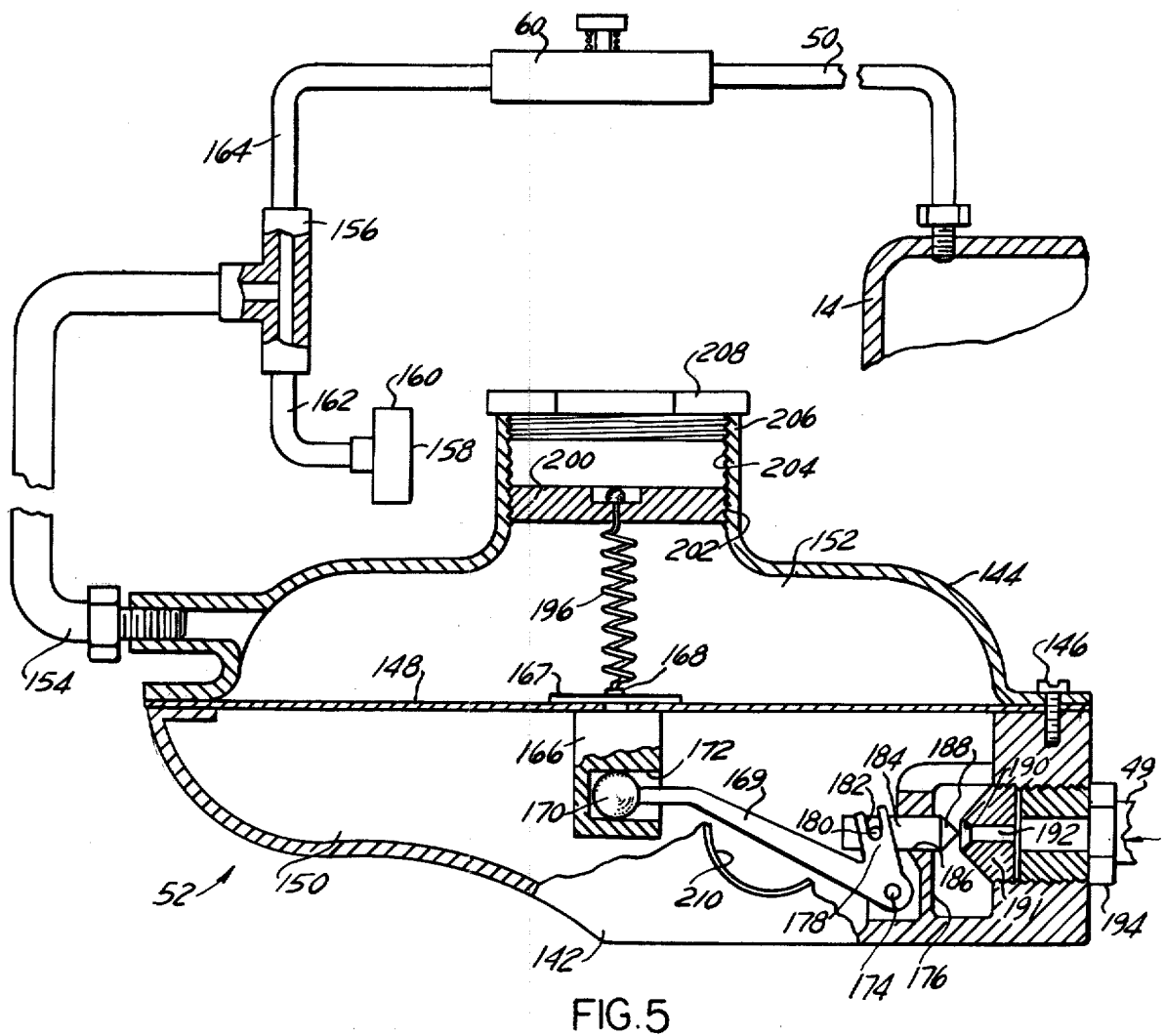
FIG. 5 is a schematic partial section through another portion of the fuel system of FIG. 1.

FIG. 5 illustrates the detail of the proportioning and modulating valve 52 disposed downstream from the expansion chamber 48, and supplying the propane gas on demand to the low pressure line 54, FIG. 1, through the shut-off valve 56. The valve 52, as illustrated in detail at FIG. 5, has a housing 142 provided with a cover 144 fastened over the housing by means of appropriate fasteners such as screws 146, a flexible diaphragm 148 being clamped between the housing 142 and the cover 144 at their junction plane. The flexible diaphragm 148 separates the interior of the valve 52 into two chambers, a gas chamber 150 disposed below the flexible diaphragm 148 and a vented chamber 152 disposed above the flexible diaphragm 148. The pressure in the vented chamber 152 varies as a function of the pressure inside the inlet manifold 14, from atmospheric pressure when the engine is shut off to lower than atmospheric pressure when the engine is running. For that purpose, rather than being placed directly in communication with the inlet manifold 14, as schematically illustrated at FIG. 1, the vented chamber 152 preferably is placed in communication, via a line 154 and through a T-connector 156, to the line 58 through which is circulating air drawn into the inlet manifold 14 at a flow rate which is a function of the vacuum within the inlet manifold 14. The air is drawn into the inlet manifold 14 in minute amount through the line 58 as adjusted by the needle valve 60, the air being caused to flow from an inlet 158, provided preferably with a small air filter 160, through a line 162 connected to the T-connector 156, and through a line 164 between the T-connector and the needle valve 60. In such manner, the rate of air flow from the filtered inlet 158 to the manifold 14 through the line 162, the T-connector 156, the line 164, the needle valve 60 and the line 58 is modulated as a function of the load of the engine. The modulated flow of air through the circuit creates a suction within the T-connector 156 resulting in a modulation of the variable pressure in the vented chamber 152 below atmospheric pressure.

A stud member 166 is fastened to the lower face of the flexible diaphragm 148, within the gas chamber 150 of the valve 52, by means of a retainer nut or disc 167 threading over a threaded reduced diameter portion 168 of the stud member 166 passed through an appropriate mounting aperture in the flexible diaphragm 148. The stud member 166 is operatively coupled to an end of a lever 169 by means of a spherical member 170 formed integrally on the end of the lever 168 and slidably engaged in a radial bore 172 in the stud member 166. The lever 169 pivots around a pivot pin 174 affixed to a web portion 176 of the housing 142, the lever arm 169 being provided on its pivoting end with a bifurcated arm member 178 which, by means of a radial pin 180 engaged in a slot 182 formed in the end of the arm member 178, reciprocates a valve needle in the form of a plunger 184 reciprocable within a bore 186 on the end of the web 176 of the housing 142. The needle valve plunger 184 has a conical end 188 engageable with the conical set 190 of an insert 191 defining an inlet port 192 into the gas chamber 150, the inlet gas line 49 being connected to the inlet port 192 by means of an appropriate fitting 194.

A tension coil spring 196 is fixedly attached at one end to the mounting end 168 of the stud member 166 and at its other end to an adjustment disc 200 having a peripheral thread 202 engaging the inner thread 204 formed in a cylindrical neck portion 206 of the valve cover 144. The coil spring 196 is adapted to adjustably urge the diaphragm 148 in deformation towards the chamber 152. The opening in the cylindrical neck portion 206 of the valve cover 144 is obturated by a closure plug 208, after adjustment of the amount of pull exerted on the flexible diaphgram 148 by the spring 196 as a result of rotating the adjusting disc 200 in one direction or the other.

When the butterfly valve, not shown, of the carburetor 16, FIG. 1, is closed, the pressure in the inlet manifold 14 is very low, and atmospheric air flows from the air inlet 158 through the line 162, the T-connector 156, the line 164, the needle valve 60 and the line 58 at a relatively high rate, thus causing a strong suction to be exerted on the end of the line 154 connected to the T-connector 156. This results in the pressure within the vacuum chamber 152 of the valve 52 dropping to a minimum. The diaphragm 148 is therefore displaced towards the chamber 152, upwardly displacing the stud member 166 and, through the lever 169, displacing the valve plunger 184 to the right, as seen in the drawing, thus causing the conical end 188 of the valve plunger 184 to be displaced toward the conical seat 190 of the valve seat insert 191 at the inlet port 192 of the gas chamber 150 and, consequently reducing to a minimum the flow of propane gas from the expansion chamber 48 through the inlet port 192 into the gas chamber 150. As the gas chamber 150 is connected to an appropriate outlet 210 in the valve housing 142 to the low pressure gas inlet line 54, FIG. 1, the flow of gas through the inlet line 54 to the gas venturi 30 is reduced to a minimum, just enough to permit the engine to idle. However, when the carburetor throttle valve is wide open, pressure inside the inlet manifold 14 increases, thus reducing the flow of air from the air inlet 158 through the line 164, the T-connector 156, the line 164, the needle valve 60 and the line 58 to a minimum. The pressure the chamber 152 of the proportioning valve 52 increases, thus permitting the diaphragm 148 to return towards the gas chamber 150. The stud member 166 is displaced downwardly, with the result that the valve needle plunger 184 is displaced leftwardly in a direction which increases the space between the conical end 188 of the valve needle plunger and the conical valve seat 190, thus increasing the flow of gas through the port 192 into the gas chamber 150, and out of the gas chamber 150 through the outlet 210, via the low pressure line 54 to the gas venturi 30. In such manner, the gas flow through the low pressure line 54, FIG. 1, is modulated as a function of the carburetor throttle valve opening, with the result that propane gas flow to the venturi 30 is reduced during idling or low power operation of the engine, and is increased as a function of the power demand on the engine as represented by throttle opening.

Providing a motor vehicle with an LP gas vapor fuel system, such as a propane vapor fuel system, according to the present invention permits to effectuate considerable savings in the cost of operating the vehicle, in view of the fact that, at present rates, the cost per gallon of liquified propane is considerably less than the cost of a gallon of gasoline, and it has been experimentally found that the propane gas fuel system of the invention provides slightly better mileage per gallon of liquified propane than provided per gallon of gasoline, an improvement of about 10% in most installations, contrary to what is achieved by prior art propane fuel systems. The system of the invention requires no modification to the engine or gasoline carburetor and, although liquified propane provides slightly less BTU per gallon than gasoline, it has been found that running a motor vehicle on propane vapor or gas according to the present invention provides no noticeable difference in power output, because of the more thorough mixing of the fuel-air intake charge and the better combustion of the charge in the cylinders. While running on propane gas, the engine runs generally smoother than while running on gasoline. Another advantage of propane over gasoline is that it has a very high octane rating, thus allowing high compression ratios, it burns much cleaner and it does not discharge any toxic or obnoxious contaminants into the atmosphere. Cold starts are improved as the fuel is fully vaporized prior to reaching the carburetor, there is no fuel line freeze-up in the winter and no vapor lock problems in the summer. The engine may be run somewhat leaner than when running on gasoline.

By installing a dual-fuel system according to the invention on a motor vehicle, better use of available fuels is achieved and, by leaving the gasoline fuel system intact and installing, in the luggage compartment for example, a propane tank of the same capacity as the conventional gasoline fuel tank, the range of the vehicle can be doubled before both tanks are run dry, and great flexibility in the use of available fuels may be enjoyed according to whatever fuel is in greater supply and at a lower price.

Having thus described the present invention by way of an example of an embodiment thereof, modifications whereof will be apparent to those skilled in the art, what is claimed as new is as follows:

1. An LP gas fuel feed system for an internal combustion engine having an intake for a fuel-air mixture, said fuel feed system comprising a tank containing said LP gas under pressure in a liquid form, first gas conduit means having an inlet disposed in said tank above the level of said LP gas in a gaseous form, second gas conduit means, pressure regulator means between said first and second gas conduit means for reducing the pressure of said LP gas in a gaseous form during passage from said first gas conduit means to said second gas conduit means, an expansion chamber in said second gas conduit means, gas flow modulation means for modulating the flow of said gas through said second gas conduit means as a function of power requirement of said engine, means at the end of said second conduit means for supplying a mixture of said gas and of air at the intake of said internal combustion engine, means for heating said tank, said expansion chamber and at least a portion of said conduit means, and means for maintaining said tank at a predetermined temperature.

2. The fuel feed system of claim 1 wherein said heating means comprises a heat exchanger means engaged with the surface of said tank, and conduit means for supplying hot coolant from the cooling system of said engine to said heat exchanger means.

3. The fuel feed system of claim 1 wherein said means for maintaining said tank at a predetermined temperature comprises temperature sensitive control means attached to said tank, and means controlled by said temperature sensitive control means for turning on and off said means for heating said tank.

4. The fuel feed system of claim 2 further comprising temperature sensitive control means attached to said tank and valve means disposed in said heat coolant conduit means for shutting off and re-establishing the flow of hot coolant therethrough.

5. The fuel feed system of claim 1 further comprising gas flow shut-off means disposed at the inlet of said first gas conduit means and at the outlet of said second gas conduit means.

6. The fuel feed system of claim 1 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

7. An LP gas fuel feed system for an internal combustion engine having an intake for a fuel-air mixture, said fuel feed system comprising a tank containing said LP gas under pressure in a liquid form, first gas conduit means having an inlet disposed in said tank above the level of said LP gas in a gaseous form, second gas conduit means, pressure regulator means between said first and second gas conduit means for reducing the pressure of said LP gas in a gaseous form during passage from said first gas conduit means to said second gas conduit means, an expansion chamber in said second gas conduit means, gas flow modulation means for modulating the flow of said gas through said second gas conduit means as a function of power requirement of said engine, and means at the end of said second conduit means for supplying a mixture of said gas and of air at the intake of said internal combustion engine, wherein said gas flow modulation means comprises a housing, a deformable flexible diaphragm separating said housing into a first and a second chamber, conduit means placing the inlet manifold of said engine in communication with the atmosphere, second conduit means placing said first conduit means in communication with said first chamber for varying the pressure in said first chamber as a function of the flow of atmospheric air in said first conduit means, a gas inlet port and a gas outlet in said second chamber, reciprocating valve plunger means for gradually closing and opening said inlet port, and pivoting lever means having an end attached in said second chamber to said flexible diaphragm and another end attached to said reciprocating valve plunger means for urging said plunger to a position tending to obturate said inlet port upon displacement of said flexible diaphragm towards said first chamber for modulating the flow of gas into said second chamber as an inverse function of the pressure of said first chamber.

8. An LP gas fuel feed system for an internal combustion engine having an intake for a fuel-air mixture, said fuel feed system comprising a tank containing said LP gas under pressure in a liquid form, first gas conduit means having an inlet disposed in said tank above the level of said LP gas in a gaseous form, second gas conduit means, pressure regulator means between said first and second gas conduit means for reducing the pressure of said LP gas in a gaseous form during passage from said first gas conduit means to said second gas conduit means, an expansion chamber in said second gas conduit means, gas flow modulation means for modulating the flow of said gas through said second gas conduit means as a function of power requirement of said engine, and means at the end of said second conduit means for supplying a mixture of said gas and of air at the intake of said internal combustion engine, wherein said expansion chamber comprises a tubular member closed at both ends, inlet means introducing said LP gas in said tubular member at a predetermined level, outlet means from said tubular member at a level higher than said predetermined level, and means applying heat to said expansion chamber.

9. The fuel feed system of claim 8 further comprising drain means disposed in said tubular member for draining the interior of said tubular member.

10. An LP gas fuel feed system for an internal combustion engine having an intake for a fuel-air mixture, said fuel feed system comprising a tank containing said LP gas under pressure in a liquid form, first gas conduit means having an inlet disposed in said tank above the level of said LP gas in a gaseous form, second gas conduit means, pressure regulator means between said first and second gas conduit means for reducing the pressure of said LP gas in a gaseous form during passage from said first gas conduit means to said second gas conduit means, an expansion chamber in said second gas conduit means, gas flow modulation means for modulating the flow of said gas through said second gas conduit means as a function of power requirement of said engine, and means at the end of said second conduit means for supplying a mixture of said gas and of air at the intake of said internal combustion engine, wherein said means for supplying a mixture of said gas and of air at the intake of said internal combustion engine comprises a first venturi-shaped conduit, a second venturi-shaped conduit disposed concentric within said first venturi-shaped conduit and having an inlet substantially at the inlet of said first venturi-shaped conduit and an outlet substantially at the level of the smallest diameter of said first venturi-shaped conduit, and a gas nozzle connected to the end of said gas conduit means and disposed concentric within said second venturi-shaped conduit with its outlet substantially at the level of the smallest diameter of said second venturi-shaped conduit.

11. The fuel feed system of claim 2 further comprising gas flow shut-off means, a carburetor mounted at said internal combustion engine intake, a liquid fuel tank and a liquid fuel feed means connecting said liquid fuel tank to said carburetor, liquid fuel flow shut-off means, and control means for operating said liquid fuel shut-off means to a shut-off position while simultaneously turning on said gas flow shut-off means.

12. The fuel feed system of claim 2 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

13. The fuel feed system of claim 2 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

14. The fuel feed system of claim 3 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

15. The fuel feed system of claim 4 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

16. The fuel feed system of claim 5 further comprising a carburetor mounted at said internal combustion engine intake, a liquid fuel tank and liquid fuel feed means connecting said liquid fuel tank to said carburetor, liquid fuel flow shut-off means, and a control means for operating said liquid fuel shut-off means to a shut-off position while simultaneously turning on said gas flow shut-off means.

17. The fuel feed system of claim 6 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

18. The fuel feed system of claim 7 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

19. The fuel feed system of claim 8 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

20. The fuel feed system of claim 7 further comprising means for heating said tank, said expansion chamber and at least a portion of said conduit means.

21. The fuel feed system of claim 20 further comprising means for maintaining said tank at a predetermined temperature.

22. The fuel feed system of claim 20 wherein said heating means comprises a heat exchanger means engaged with the surface of said tank, and conduit means for supplying hot coolant from the cooling system of said engine to said heat exchanger means.

23. The fuel feed system of claim 21 wherein said means for maintaining said tank at a predetermined temperature comprises temperature sensitive control means attached to said tank, and means controlled by said temperature sensitive control means for turning on and off said means for heating said tank.

24. The fuel feed system of claim 22 further comprising temperature sensitive control means attached to said tank and valve means disposed in said heat coolant conduit means for shutting off and re-establishing the flow of hot coolant therethrough.

25. The fuel feed system of claim 7 further comprising gas flow shut-off means disposed at the inlet of said first gas conduit means and at the outlet of said second gas conduit means.

26. The fuel feed system of claim 7 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

27. The fuel feed system of claim 8 further comprising means for heating said tank, said expansion chamber and at least a portion of said conduit means.

28. The fuel feed system of claim 27 further comprising means for maintaining said tank at a predetermined temperature.

29. The fuel feed system of claim 27 wherein said heating means comprises a heat exchanger means engaged with the surface of said tank, and conduit means for supplying hot coolant from the cooling system of said engine to said heat exchanger means.

30. The fuel feed system of claim 28 wherein said means for maintaining said tank at a predetermined temperature comprises temperature sensitive control means attached to said tank, and means controlled by said temperature sensitive control means for turning on and off said means for heating said tank.

31. The fuel feed system of claim 29 further comprising temperature sensitive control means attached to said tank and valve means disposed in said heat coolant conduit means for shutting off and re-establishing the flow of hot coolant therethrough.

32. The fuel feed system of claim 8 further comprising gas flow shut-off means disposed at the inlet of said first gas conduit means and at the outlet of said second gas conduit means.

33. The fuel feed system of claim 8 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

34. The fuel feed system of claim 10 further comprising means for heating said tank, said expansion chamber and at least a portion of said conduit means.

35. The fuel feed system of claim 34 further comprising means for maintaining said tank at a predetermined temperature.

36. The fuel feed system of claim 34 wherein said heating means comprises a heat exchanger means engaged with the surface of said tank, and conduit means for supplying hot coolant from the cooling system of said engine to said heat exchanger means.

37. The fuel feed system of claim 35 wherein said means for maintaining said tank at a predetermined temperature comprises temperature sensitive control means attached to said tank, and means controlled by said temperature sensitive control means for turning on and off said means for heating said tank.

38. The fuel feed system of claim 36 further comprising temperature sensitive control means attached to said tank and valve means disposed in said heat coolant conduit means for shutting off and re-establishing the flow of hot coolant therethrough.

39. The fuel feed system of claim 10 further comprising gas flow shut-off means disposed at the inlet of said first gas conduit means and at the outlet of said second gas conduit means.

40. The fuel feed system of claim 10 further comprising gas flow shut-off means, a carburetor mounted at said internal combustion engine intake, a liquid fuel tank and liquid fuel feed means connecting said liquid fuel tank to said carburetor, liquid fuel flow shut-off means, and control means for operating said liquid fuel shut-off means to a shut-off position while simultaneously turning on said gas flow shut-off means.

* * * * *